Patented Aug. 11, 1931

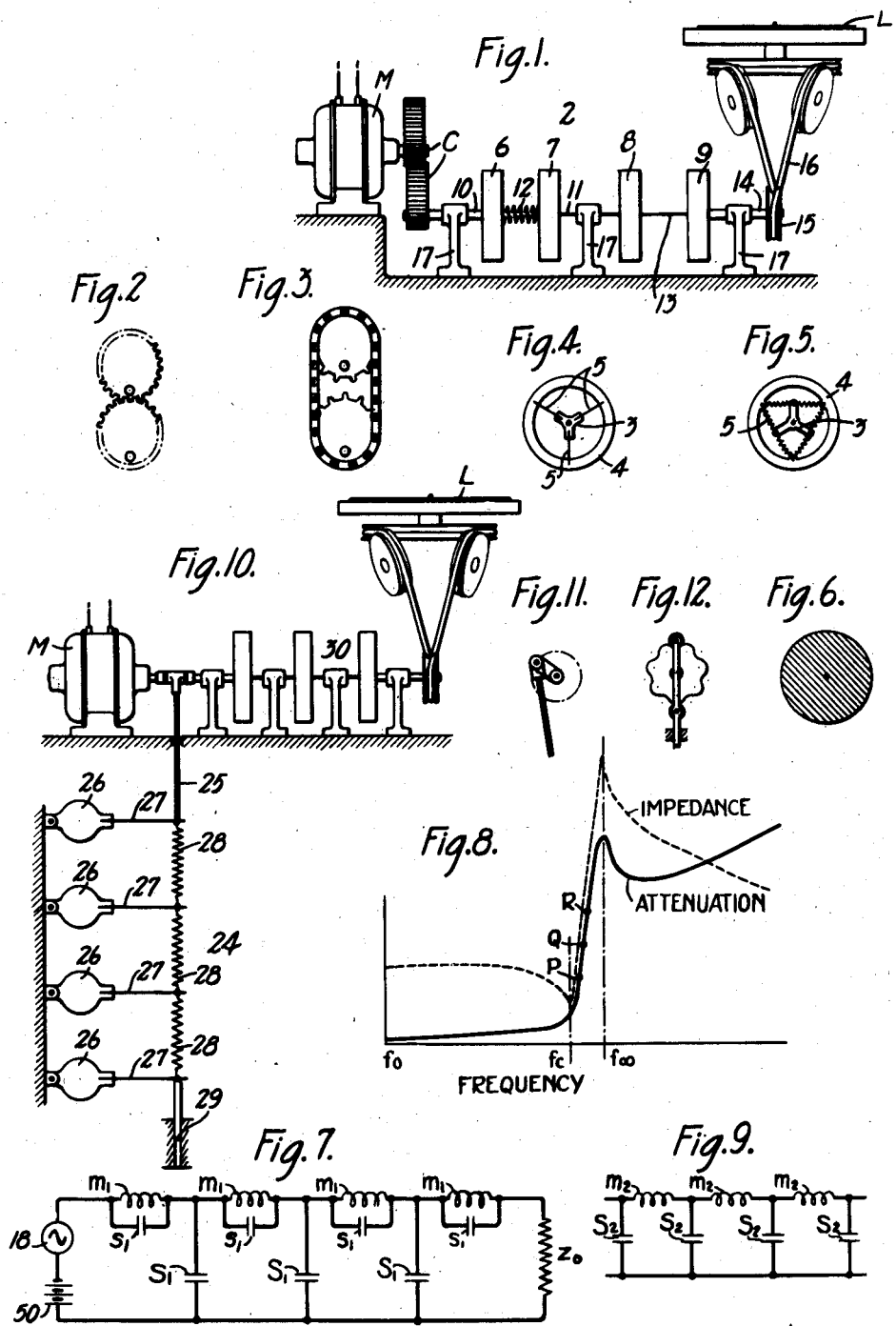
Inventor:
Henry C. Harrison

1,818,131

UNITED STATES PATENT OFFICE

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK

MECHANICAL TRANSMISSION SYSTEM

Application filed December 31, 1925. Serial No. 78,502.

The invention relates to transmission systems and particularly to systems for transmitting mechanical energy.

An object of the invention is to regulate the speed of apparatus in such systems.

Another object is to regulate the speed of rotation or reciprocation of prime movers subject to variations in speed, and that of members driven thereby.

A feature of the invention is the production of a vibratory motion of frequency directly proportional to the speed of rotation of a driving motor, and the utilization of this vibratory motion to effect the speed regulation of the motor.

Another feature of the invention is the use of mechanical resonance to produce large changes of velocity in a controlling mechanism corresponding to small changes in the speed of a driving motor and thereby to effect large changes in the motor load.

The invention is particularly applicable to systems in which prime movers are employed to drive machines whose satisfactory operation is dependent on substantial constancy of rotation or reciprocation within narrow limits, as, for example, phonograph recording and reproducing systems, picture retransmission systems and the like. It has been found extremely difficult in practice to reduce to a satisfactory extent for the puropses mentioned the speed variations to which most prime movers are subject.

In accordance with the present invention, means are provided for maintaining constant to a high degree, the speed of rotation or reciprocation of prime movers. Means are provided also for making the speed of rotation or reciprocation of devices driven by prime movers substantially independent of fluctuations in the speed of the prime mover. These objects are accomplished by linking the prime mover associated with the driven device to a vibrating system in such a way that vibrations are produced of a frequency directly proportional to the speed of the prime mover, and utilizing the resonance properties of the vibrating system to vary the load on the prime mover, thereby effecting a regulation of the speed. At the same time the vibrations of the resonant system are prevented from reaching the driven device by the use of a mechanical vibration filter.

In one embodiment the invention utilizes a multi-section mechanical vibratory system, which is adapted to function both as the resonance device for the purpose of speed regulation, and also as the mechanical vibration filter by which the speed regulating vibrations are prevented reaching the load. The vibratory system may, for example, comprise a chain of flywheels coupled together by springs, or mounted on a torsionally flexible shaft, this arrangement constituting a vibration filter adapted to prevent the transmission of all vibrations above a certain critical frequency. To provide the proper resonance characteristic for speed regulation, the flywheels comprise a heavy rim attached to the center hub by transversely elastic springs. The vibrations by which the speed control is effected are introduced by means of an elliptical gear, or other form of variable velocity gearing, between the motor and the transmission system.

In another embodiment the speed controlling resonant system and the vibration filter are separate units. The load device is connected through the vibration filter to the driving motor in the usual manner, and the resonant system is driven through a variable velocity gearing connected to the motor driving shaft.

The general method of the speed control is by causing the load on the motor to increase sharply as its speed tends to rise above its normal value. The load increment is contributed by the elastic and inertia reactions of the resonant system, and by the energy dissipation in its moving parts. Sharpness of the control is achieved by adjusting the normal speed of the motor to a point at which the vibrations have a frequency close to, but lower than, the resonance frequency of the resonant device, whereby a small increase in the motor speed results in very large changes in the velocities of the resonant elements, and hence in a sharp increase in the motor load.

The objects and advantages of the invention briefly described above will be brought out in the following detailed description when read in connection with the accompanying drawings in which Fig. 1 illustrates one form of the invention utilized for driving apparatus such as a phonograph turntable from an electric motor;

Figs. 2 and 3 illustrate different types of coupling means which may be employed in the system of Fig. 1;

Figs. 4, 5, and 6 illustrate details of the mechanical rotary systems used in the system of Fig. 1;

Fig. 7 is a schematic impedance diagram of the system of Fig. 1;

Fig. 8 shows the frequency characteristics of the vibration filter of Fig. 1;

Fig. 9 is a schematic impedance diagram of the vibration filter of Fig. 10;

Fig. 10 illustrates a modification of the system of the invention in which the resonance device and the vibration filter comprise separate units;

Figs. 11 and 12 illustrate different types of couplings adapted for use in the system of Fig. 10.

In Fig. 1 there is illustrated one arrangement in accordance with the invention for driving a load device L, such as the turntable of a phonograph instrument, at substantially constant speed from a prime mover M subject to variations in speed. The prime mover M may be of any suitable type such as an electric motor, direct current or induction, as illustrated, a gravity motor, a spring motor or a wheel driven by air, water or steam, all of which are subject to speed variations from various causes. A coupling device C is used to connect the shaft of the motor M with the shaft of a rotating system 2 so that the system 2 is not only continuously rotated but is also vibrated at a frequency which is determined by the speed of rotation of the shaft of the motor M. The coupling device C may be of any type adapted for superposing an oscillatory motion upon the continuous uni-directional motion of the motor shaft but is preferably of a type such as to make the oscillations follow a sinusoidal law so as to avoid the production of component frequencies in the resulting motion of the mechanical system which will be objectionable harmonics of the fundamental motion. For example, the coupling device may comprise elliptical gears as shown in Fig. 2 or elliptical chain sprockets as shown in Fig. 3. The rotary system 2 as shown in Fig. 1, may comprise a plurality of similar wheels, 6 to 9, serially coupled by suitable elastic means. The wheels 6 to 9 may be of the types illustrated in Figs. 4 and 5 comprising hubs 3 connected to heavy rims 4 by elastic connections 5, such as leaf or helical springs. A shaft 10 is employed for connecting the hub of wheel 6 to the coupling C and an elastic rod 11 is employed for connecting the hub of wheel 7 to the hub of wheel 8; a helical spring 12 is employed for connecting the hub of wheel 6 to the hub of wheel 7, while wheels 8 and 9 are coupled by a simple elastic shaft 13 similar to rod 11. A shaft connects the wheel 9 to the pulley 15, which, by means of the belt 15 serves to rotate turntable L. The rods 10, 11 and 14, are supported by suitable bearings 17 in such a way that the system 2 may be rotated therein with a minimum of friction.

As the armature of the motor M rotates the flywheel coupling system is set into motion through the elliptic gearing, the motion being in part a uniform rotation and in part a vibratory oscillation superimposed thereon. The elliptic gear converts the uniform turning moment of the motor into a turning moment which also comprises two components, one uniform and the other alternating. The non-uniform motion of the flywheel system results in a swinging of the flywheel rims relatively to their hubs as well as a swinging of the flywheels relatively to each other. At low speeds the swinging motions are slight and the flywheels may be regarded as approximately rigid structures, rigidly connected. Under these conditions the motion at the end of the system is also undulatory.

This condition holds for a considerable range of speeds, but as the speed is increased a point is reached at which the oscillation of the flywheel rims about their hubs becomes important. At first this oscillation produces little effect, for the reason that the reaction forces of the flywheel are out of phase with the alternating force introduced by the gearing, but as the speed is approached which corresponds to the natural period of the flywheel rim and its spring connections to the hub, these reaction forces increase sharply and come into phase opposition with the applied force. A sharp increase of the motor load with speed occurs and the motor slows down until a steady condition is secured.

At its natural period the oscillation of the flywheel has two important characteristics. An alternating force applied at the hub produces a large motion of the rim, that is, the rim and the spring spokes form a resonant combination and the forces restraining their motions mutually neutralize each other. The motion of the hub, however, is very small and is opposed by augmented forces, in fact, by the combination of the forces in the spring spokes and the massive rim, which neutralize each other with respect to the motion of the rim. At the rim the system is characterized by increased vibration and a neutralization of forces; at the hub the vibratory motion is diminished and large opposing forces appear. With respect to the motion of the rim or of the spring spokes the system is said to be resonant, and with respect to the motion of the hub the system is said to be anti-resonant. The two conditions are defined generally as resonance conditions.

As the resonance speed is approached the flywheels begin to act as though they were possessed of greatly increased inertia and the action of the spring couplings between the flywheels becomes more dominant. Due to this oscillating motion is no longer transmitted through the system, but is opposed by the inertia of the wheels and absorbed in the resilience of the coupling springs. By using a sufficient number of coupled flywheels the oscillation may be practically eliminated and only a pure rotary motion transmitted. The change from the condition corresponding to an approximately rigid system to the condition corresponding to a flexible system in which the oscillation is suppressed is not gradual, but is rather sharp. It occurs in the neighborhood of a rotational speed corresponding to a certain oscillation frequency which will be called the cut-off frequency of the system. This frequency depends on the oscillation characteristics of the system as a whole and may be determined from the moments of inertia of the flywheels and the torsional moments of the various springs. Formulæ for its evaluation will be given later, but it may be noted that, due to the fact that the effective masses of the flywheels increase as the speed increases towards the resonance condition, the cut-off frequency is always below the natural period of the flywheels.

The mechanical system 2 is a vibration filter, which, by the arrangement and the proportioning of the masses and elasticities of its elements is adapted to transmit from the driving end to the load, vibrations of all frequencies below a certain value, and to prevent the transmission of vibrations of all other frequencies.

For the better understanding of the operation of the system it is convenient to make use of a schematic representation by which the relationships of the various elements of the system to each other are clearly displayed, and from which the functions of the several elements may be readily deduced. Schematics of this kind are commonly used in connection with electrical circuits, and since the transmission of vibratory motion through the system of Fig. 1 takes place in a manner completely analogous to the transmission of alternating currents through an electrical wave filter, it is evident that the same conventional type of schematic as is used to represent electrical circuits may be applied by analogy to represent mechanical vibration systems.

The mechanical-electrical analogy is based on the fact that in both types of system wave energy is propagated with a periodic change from the static to the kinetic form. From this it follows that the same mathematical equations that describe the currents in the branches of an electrical system under a given electro-motive force may be used to define the vibration velocities of the parts of a corresponding mechanical system under an impressed vibratory force. In the mechanical field the quantities force, velocity, mass, and elasticity, correspond respectively to the electrical quantities electro-motive force, current, inductance, and the reciprocal of capacity. In electrical systems the ratio of an applied electro-motive force to the resulting current when a steady state has been reached is termed the impedance, so in a mechanical system the ratio of an impressed force to the resulting steady velocity is termed the mechanical impedance of the system. When the mechanical force or the electromotive force is periodic the resulting steady velocity or current is also periodic and the impedance is measured as the ratio of the root-mean-square value of the applied force to the root-mean-square value of the velocity.

In the schematic representation of a mechanical system, masses are represented by the same conventional signal as electrical inductances, and springs are represented by the capacity symbol. Line elements and coupling elements, the distinction between which will be discussed later are shown as series elements and shunt elements respectively in the schematic. Fig. 7 is such a schematic diagram of the mechanical system 2. The combinations comprising masses $m_1$ and elasticities $s_1$ correspond to the spring flywheels 6, 7, 8 and 9, and the elasticities $S_1$ are those of the coupling springs 11, 12 and 13. The driving force of the motor is represented conventionally by the combination of battery 50 and alternator 18, the former corresponding to the average unidirectional driving force, and the latter to the vibratory force introduced by the gearing. The load, comprising the total resistance to motion offered by the turntable L, due to its inertia and friction and the drag of the phonograph stylus etc., is represented by the generalized impedance $Z_0$. The combinations, $m_1$, $s_1$, are of the anti-resonant type and are connected in series in the transmission line. The elasticities $S_1$ serve as coupling impedances between the successive anti-resonant combinations.

The division of the elements into series, or line members and coupling members is based on the difference in their functions in the propagation of motion through the system. The line members, or the line combinations as a whole, partake of the full line velocity and transmit it undiminished to the succeeding elements. In so doing they absorb some of the driving force. The coupling members transmit the driving force from the one line member to the next, and in the process absorb some of the motion. A simple method of distinguishing between the line and the coupling members is as follows: If a line member, or combination, is made completely rigid and prevented from moving, transmission of motion through the system is completely stopped. The motion will also be stopped if a coupling member is made perfectly free to move, for example, if spring 12 were made so flexible that it could be coiled up indefinitely without opposing any elastic reaction.

With the help of the mechanical-electrical analogy it is a simple matter to apply the formulæ for electrical wave filters to the calculation of the mass and elasticity coefficients of a mechanical vibration filter for any purpose. For the design formulæ reference is made to U. S. Patent 1,227,113, May 22, 1917 to G. A. Campbell, U. S. Patent 1,538,964, May 26, 1925 to O. J. Zobel and to the Bell System Technical Journal, Volume II Number 1, January 1923, "Theory and design of uniform and composite electric wave filters—Otto J. Zobel."

By virtue of the anti-resonant properties of the line combinations, $m_1$, $s_1$, that is, the spring flywheels 6, 7 etc., all of which are alike, the vibration filter 2 is characterized by a very sharply rising mechanical impedance in the frequency range just above its critical, or cut-off frequency. This is illustrated by the impedance-frequency characteristic shown in Fig. 8. The attenuation, which is a measure of the diminution of the vibrations from one section to the next, also rises sharply in the same range and reaches a minimum at the anti-resonance frequency of the line combinations.

In operation, the motor is adjusted to run at a speed such that the gear C produces vibration of frequency slightly below the anti-resonant frequency of the spring flywheels, corresponding, for example, to the point Q on the attenuation characteristic. At this speed the vibrational impedance is relatively low and is composed principally of the inertia reaction of the rim of flywheel 6, increased somewhat by the partial resonance. Since the impedance is due to the inertia effect, the vibrational velocity lags in phase about 90° behind the impressed vibratory force, and consumes but little energy. Should the motor from any cause tend to increase its speed the frequency of the vibrations is increased and the flywheel 6, being closer to its resonance condition, oscillates more violently, producing a greatly increased reaction on the driving gear. On account of the natural dissipation in the oscillating parts, the reactive force changes its phase and comes more nearly into continuous opposition to the motor driving force. This continuous opposition results in a consumption of energy which must be derived from the driving motor, or in other words, in an increased load on the motor which tends to counteract the increased speed.

On account of the sharpness of the resonance effects characteristic of mechanical structures, a very small change in the motor speed is sufficient to produce a very great increase in the vibrational velocity of the flywheel, and a correspondingly great increase in the motor load. The normal power of the motor should, of course, be such as will enable it to maintain a speed for which the vibration frequency corresponds to a point in the sensitive range.

Manifestly the vibrations introduced by the gear C should not be permitted to reach the turn-table L, their purpose being related solely to the operation of the speed control means. The remaining sections of the system 2 in their function as, a vibration filter attenuate these vibrations to a negligibly small value.

Fig. 10 shows a modification of the system of Fig. 1 in which a separate vibratory system 24 is utilized for controlling the average speed of the motor M. The shaft of the motor M, as shown in this figure is coupled to the vibratory mechanical system 24 by means of a coupling arrangement 25. This coupling device 25 may be of any suitable type, such as a bell crank as shown in Fig. 11 or the cam as shown in Fig. 12, adapted for translating part of the rotational motion of the motor shaft into oscillatory motion which is imparted to the system. This oscillatory motion which is imparted to the vibratory system 24 by the coupling device 25 has, therefore, a frequency which is dependent upon the speed of rotation of the shaft of the motor M.

The vibratory system 24 as shown in Fig. 10 comprises a plurality of similar solid masses 26 each pivoted at their ends to a heavy mass. The elastic connections 27, which may be flat leaf springs, have one of their ends rigidly connected to the masses 26, and have their free ends, connected to a sequence of helical springs 28. The vibratory system 24 is terminated at one end by means of a mechanical resistance 29 of any suitable type. This system is a vibration filter of a type similar to the vibration filter 2, and is also represented schematically by the impedance diagram of Fig. 7. The anti-resonant line combinations comprise the springs 27 and the masses 26, while the coupling members are the springs 28. The mechanical terminating resistance 29 in system 24 corresponds to the terminating impedance $Z_0$ in the electrical circuit of Fig. 7.

The vibratory system 24 is utilized in the same manner as the filter 2 to control the average speed of the motor M. Although, as in the case of filter 2, the resonance effect used for control purposes is mainly that of the line elements closest to the motor, the multi-sectional, or filter, type is advantageous because of the sharpness of the resonance characteristic that can be obtained thereby in the frequency range just above the filter cut-off frequency. The system 30 in the direct line of transmission is a separate vibration filter for preventing the control vibrations reaching the turntable. This filter comprises a series of solid flywheels, such as shown in Fig. 6, coupled together by appropriately flexible shafts. The masses and elasticities of the members should be proportioned so that the filter cut-off frequency is lower than that of the control vibrations. The impedance diagram of the filter 30 is shown schematically in Fig. 9 in which the masses of the flywheels and the elasticities of the coupling springs are represented by the elements $m_2$ and $S_2$, respectively.

It will be understood that in the foregoing description the terms force, mass, and elasticity, refer to the quantities appropriate to linear motion or to angular motion, as required by the context.

Certain specific types of prime movers, mechanical networks, and coupling arrangements have been described herein and illustrated in the drawings, but it is to be understood that the invention is not limited to these types but only by the structures as defined in the appended claims.

It is obvious that the general principles herein disclosed may be employed in other and different forms without departing from the spirit of the invention as defined in the appended claims.

What is claimed is:

1. The method of controlling the speed of a mechanical system comprising a driving motor and a driven member which includes the steps of producing mechanical vibrations proportional to the speed of the driving motor, multiplying by resonance the increase in vibrational velocity due to an increase in the motor speed whereby the load on the motor is sharply increased, and attenuating the mechanical vibrations to prevent them reaching the driven member.

2. In a mechanical transmission system comprising a driving motor and a driven mechanism, speed control means, comprising means for converting part of the motor energy into vibration energy of frequency dependent on the motor speed, a vibratory mechanical device tuned to resonate at a frequency close to the vibration frequency corresponding to the normal motor speed, and means for impressing the vibratory energy upon said device, whereby said device operates as a controlling load on said motor, varying sharply in response to changes in the motor speed, and in combination therewith a vibration filter connected between said resonant device and said driven mechanism to prevent the transmission of the said vibratory energy to said driven mechanism.

3. A mechanical transmission system comprising in combination a driving motor, a driven mechanism and an intermediate coupling system, said coupling system comprising a variable velocity gearing, adapted to superimpose a vibratory component upon the normal velocity of the coupling system, and a vibration filter including resonant line members tuned to resonate at a vibration frequency slightly greater than the normal frequency of the said vibratory component, said line members being adapted by their resonance characteristics to oppose an increase in the motor speed by sharply increasing the motor load, and said vibration filter as a whole being adapted to prevent the transmission of the vibratory energy to the driven mechanism.

In witness whereof, I hereunto subscribe my name this 29th day of December, A. D. 1925.

HENRY C. HARRISON.